Aug. 6, 1968     F. S. PAYERLE     3,395,429

END FITTINGS FOR PUSH-PULL CABLE CORES

Filed July 1, 1965

INVENTOR.
FRANK S. PAYERLE
BY Hamilton & Cook
ATTORNEYS

United States Patent Office 3,395,429
Patented Aug. 6, 1968

3,395,429
END FITTINGS FOR PUSH-PULL CABLE CORES
Frank S. Payerle, Akron, Ohio, assignor to Morse
Controls Inc., a corporation of Ohio
Filed July 1, 1965, Ser. No. 468,852
1 Claim. (Cl. 24—125)

ABSTRACT OF THE DISCLOSURE

An adjustably positionable end fitting for the core of a push-pull control cable. The fitting has a ferrule with an axially oriented first bore therethrough adapted to receive the core. The bore extends generally perpendicularly through the end wall of the ferrule and is chamfered at the end wall. A disc-like locking plug with a second core receiving bore therethrough is receivable in juxtaposition to the end wall of the ferrule by a tightening cap which has a third core receiving bore. The first and third bores are in register when the cap has the plug juxtaposed to the end wall of the ferrule and at the same time the second bore is inclined at approximately 15° with respect to the first and third bores. The first bore, because of the chamfer, fully communicates with the second bore and the second bore, because of its location through the plug, fully communicates with the third bore when the plug is juxtaposed to the end wall in the ferrule.

---

The present invention relates generally to push-pull control cables. More particularly, the present invention relates to end fittings for the cores of push-pull control cables. Specifically, the present invention relates to a selectively positionable end fitting by which the core of a push-pull control cable can be detachably secured to a power imparting or power receiving device.

Push-pull cables, generally, are well-known to the art as devices capable of transmitting mechanical motion in either direction when at least the ends of the cable casing are satisfactorily clamped in position.

Although the prior art knows many constructions for push-pull casings, one of the most suitable constructions to assure greatest flexibility and efficiency comprises a plurality of wires laid contiguously in a long pitch helix around the outer periphery of a plastic tube. The helically arranged wires of the casing are maintained in their proper position solely by a plastic cover in the smaller cables and by a reinforcing spread helix, or wire or flat metallic ribbon, in conjunction with the plastic cover in larger cables.

In the above-described construction for cable casings the plastic tube which comprises the innermost element acts as a bearing for the core of the cable which is slidable within the casing and also acts to protect the casing wires from any natural elements gaining access to the interior of the tube. A plastic outer cover similarly protects the wires as it maintains them in their cylindrical grouping around the inner tube.

Fittings are provided at each end of the casing to provide a means for securing the control cable in operative position.

The cable core, which is reciprocally slidable in the casing, acts as the working element which transfers the mechanical motion between the power imparting and the power receiving device. Cable cores generally comprise a single strand of wire but in some situations are stranded in the form of a wire rope. In either event, they are sufficiently inextensible to transmit motion when subjected to tensile forces and are supported radially by the casing sufficiently for the prevention of excessive buckling to transmit motion when subjected to compressive forces.

To prevent buckling along that extent of the core extending exteriorly beyond the end of the casing several constructions have been devised. For example, a rigid end rod may be swaged, or otherwise permanently affixed, to the core and itself slidably received in a sleeve attached to the casing. The sleeve both directs the end rod and radially supports the core between the end of the casing and the adjacent end of the rod to which the core is affixed. Because of the permanent nature of the joinder of the cable core to the end rod, all adjustments must be made between the end rod and the device to which it is attached. This imparts a serious limitation to the adaptability of standardized components for specialized installations.

It has heretofore been impossible to provide a satisfactory adjustably positionable connection between the cable core and the end rod, particularly when the cable is to be subjected to heavy loading. The difficulty attendant upon the provision of such an adjustable connection becomes quite apparent when one realizes that some of the best push-pull cables available are capable of only about fifty percent efficiency when installed with an average number of bends between the power imparting and power receiving devices.

It is therefore an object of the present invention to provide an end fitting which is adjustably positionable on the core of a push-pull control cable.

It is another object of the present invention to provide an end fitting, as above, which can be securely attached to the cable core with a strength exceeding the maximum load to be transferred by the cable core.

It is still another object of the present invention to provide an end fitting, as above, which can be secured to the cable core without specialized tools.

It is a further object of the present invention to provide an end fitting, as above, which is as readily removable, readjustable and re-useable.

It is an even further object of the present invention to provide an end fitting, as above, which is relatively inexpensive to manufacture.

These and other objects which will become apparent from the following specification are accomplished by means hereinafter described and claimed.

One preferred embodiment is shown by way of example in the accompanying drawings and described in detail without attempting to show all of the various forms and modifications in which the invention might by embodied; the invention being measured by the appended claims and not by the details of the specification.

In general, an end fitting for the core of a push-pull cable embodying the concept of the present invention has a base, or ferrule, with a first bore therethrough to receive the core of a push-pull cable. A dislike locking plug, which has a core receiving second bore therethrough, is abuttingly positionable against the end wall of the ferrule by a tightening means so that the first and second bores intersect obliquely to crimp, and thereby lock onto, the core of the push-pull cable. The ferrule, locking plug and tightening means thus comprise an end fitting by which the core is selectively attachable to a power imparting or receiving device.

Figure 1:
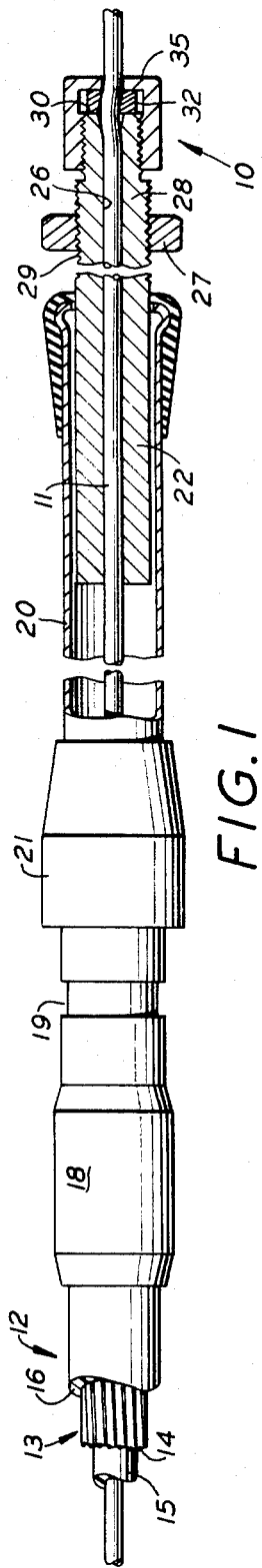
FIG. 1 is a side elevation, partly broken away and partly in section, depicting a push-pull control cable the core of which has an end fitting constructed according to the concept of the present invention attached thereto.

Referring more particularly to the drawings, the subject end fitting is indicated generally by the numeral 10 and is depicted, in FIG. 1, as being secured to the core 11 of a push-pull cable assembly 12. A push-pull cable assembly 12 includes the core 11 and the casing 13 in which the core is reciprocally slidable.

The prior art knows many casing constructions, one of which is depicted environmentally herein and comprises a plurality of wires 14 contiguously laid in the form of a helical coil about the radially outer surface of an inner, flexible tube 15 which extends the full length of the casing. An outer flexible cover 16 encases the coil of wires 14 and extends along the entire casing to generally within a short distance from the end of the wires 14.

A fitting 18 is positioned over the end of the wires 14 and cover 16 and is securely attached thereto, as by swaging. A recess 19, or other attaching means, is provided on fitting 18 for attaching the end of the casing to an anchoring point. As shown, a sleeve 20 is mounted in a swivel-like manner on the end fitting 18, as by a socket arrangement not shown. This joint is sealed from the natural elements by a collar 21. The sealing collar 21 is most often made of rubber or some other flexible material.

An end, or extension, rod 22 is slidably received in the sleeve 20, with the sleeve closely fitted around the end rod 22 both to guide the rod and prevent excess deflection of that portion of the core 11 sliding therein when subjected to compressive forces.

The above-described structure is well-known to the art and forms no part of the present invention, the description being set forth merely to provide an environmental understanding. In fact, installations can well be envisioned where the subject end fitting for a cable core is used without either the sleeve 20 or an extension rod 22. In such an installation the structural elements necessary to the subject end fitting, compositely indicated by the numeral 10, would be positioned as closely in proximity to the fitting 18 as possible in order to minimize the dimensional extent of the unsupported length of the cable core outwardly of the casing 13 and fitting 18.

In the embodiment depicted in the attached drawings, the cable core is not affixed to the inner end of the extension rod 22 in the prior known fashion, but extends longitudinally therethrough to emerge from a closely fitting first bore 26 provided in the base, or ferrule, 28 of the end fitting portion 10 of the rod 22.

A fastening means, such as the threads 29 on the shank of the ferrule 28, is provided on the end fitting 10 by which it may be secured selectively to either a power imparting or power receiving device, as represented by the arm 27.

The end wall 30 of the ferrule 28, which is depicted as being perpendicularly oriented with respect to the first bore 26 opening therethrough, is engaged by the face 31 of a disklike locking plug 32. A closely fitted core receiving second bore 33 extends through the locking plug 32. When the end fitting 10 is fastened to a cable core 11 the first and second bores 26 and 33, respectively, intersect obliquely, the axis of one being inclined at approximately 15° with respect to the axis of the other. In the embodiment depicted, with the first bore oriented perpendicularly with respect to the end wall 30 of the ferrule 28 the second bore pierces the locking plug 32 at an angle of approximately 15° with respect to a reference line normal to face 31.

The outermost end of the first bore 26 is chamfered, as at 34, to allow the core 11 to crimp by the cooperative action of the locking plug and the ferrule without unduly abrading the outer surface of the core between the opposed edges of the first and second bores 26 and 33. This is of particular importance when one realizes that to effect the required crimping of the core 11, the locking plug 32 should be made of a material harder than that of the core 11.

Figure 3:
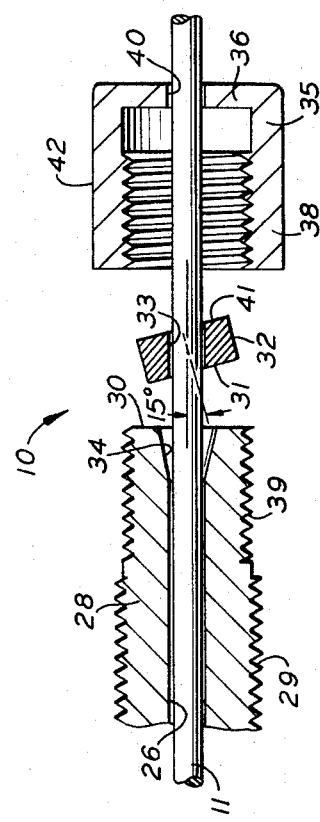
FIG. 3 is a view similar to FIG. 2 depicting the subject end fitting in an exploded condition prior to being secured to the cable core extending therethrough.
Figure 2:
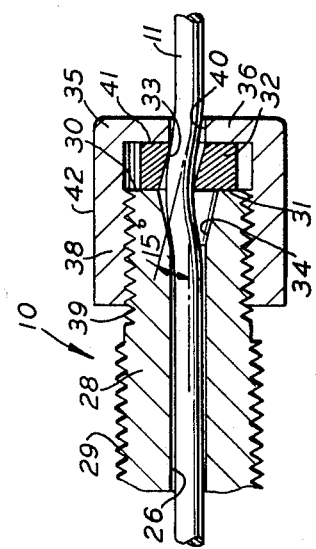
FIG. 2 is an enlarged area of FIG. 1 depicting the subject end fitting attached to the cable core.
Figure 4:
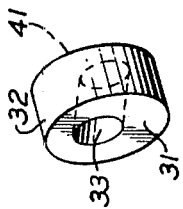
FIG. 4 is a perspective view of the disk-like locking plug employed by the subject end fitting.

This crimping of the core 11 is best observed by comparing the disposition of the core 11 as shown in FIGS. 2 and 3. In FIG. 3 the core has been inserted through the first bore 26 in the ferrule 28 and the second bore 33 in the locking plug 32. With the core 11 extending straight through the ferrule 28 and the locking plug 32, the face 31 of locking plug 32 is obliquely opposed to the end wall 30 of the ferrule 28. A tightening means is then applied which clamps the face 31 of locking plug 32 contiguously against the end wall 30 of the ferrule 28 and thereby crimps the core 11, as shown in FIG. 2, to lock the end fitting 10 to the core.

The tightening means depicted comprises a cap 35 having a base 36 with a threaded skirt 38 cooperatively interfitting with the threaded portion 39 on the outer surface of the ferrule 38. The base 36 is provided with a bore 40 which, when the cap 35 is mounted on ferrule 28, registers with the first bore 26 and fully communicates with the end of the second bore 33 opening through the outermost face 41 of the lock plug 32. As explained above, the end of the second bore 33 opening through the innermost face 31 of plug 32 fully communicates with the chamfered portion 34 of the first bore 26 so that the core 11 is not unduly abraded as it is lockingly crimped by the attachment of the fitting 10.

The radially outer surface 42 of the cap like tightening means is adapted to be engaged by either a wrench or a pair of pliers for turning the cap 35 onto and off of the threaded portion 39 of the ferrule 38.

It should therefore be readily apparent that a cable core end fitting constructed according to the concept of the present invention is inexpensive to manufacture, is readily attachable, adjustable and removable, and otherwise accomplishes the objects of the invention.

What is claimed is:

1. An end fitting for the core of a push-pull control cable comprising, a ferrule having an end wall, an axially oriented core reeciving first bore extending through said ferrule and said end wall, said first bore chamfered in proximity to said end wall, a disklike locking plug having an inner and outer face, a core receiving second bore extending through the faces of said locking plug, said inner face removably positioned against the end wall of said ferrule, a tightening means having a base movable toward and away from said end wall to clamp the inner face of said locking plug against the end wall of said ferrule, said tightening means having a core receiving third bore through said base, said first and third bores being in register when said inner face is clamped against said end wall and said second bore being inclined at approximately 15° with respect to said first and third bores with that portion of said second bore opening through said outer face communicating with said third bore and that portion of said second bore opening through said inner face communicating with the chamfered portion of said first bore.

References Cited

UNITED STATES PATENTS

| | | | |
|---|---|---|---|
| 649,542 | 5/1900 | Gerard | 279—29 X |
| 1,433,623 | 10/1922 | Johnston. | |
| 2,314,821 | 3/1943 | Fritts. | |
| 2,358,158 | 9/1944 | Gibbert | 279—29 X |
| 2,620,212 | 12/1952 | Karl | 287—115 |

FOREIGN PATENTS

| | | |
|---|---|---|
| 17,480 | 12/1915 | Great Britain. |
| 758,978 | 6/1954 | Great Britain. |

BERNARD A. GELAK, *Primary Examiner.*